United States Patent
Wang et al.

(10) Patent No.: US 11,942,784 B2
(45) Date of Patent: Mar. 26, 2024

(54) METHOD AND DEVICE FOR FORMULATING COORDINATED ACTION STRATEGY OF SSTS AND DVR FOR VOLTAGE SAG MITIGATION

(71) Applicant: Sichuan University, Sichuan (CN)

(72) Inventors: Ying Wang, Sichuan (CN); Man Wang, Sichuan (CN); Xianyong Xiao, Sichuan (CN); Wenxi Hu, Sichuan (CN); Yang Wang, Sichuan (CN); Zixuan Zheng, Sichuan (CN); Yunzhu Chen, Sichuan (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 17/848,413

(22) Filed: Jun. 24, 2022

(65) Prior Publication Data

US 2022/0416543 A1 Dec. 29, 2022

(30) Foreign Application Priority Data

Jun. 24, 2021 (CN) .......................... 202110703524.7

(51) Int. Cl.
  *H02J 3/00* (2006.01)
(52) U.S. Cl.
  CPC ......... *H02J 3/0012* (2020.01); *H02J 2203/20* (2020.01)
(58) Field of Classification Search
  CPC .. H02J 3/0012; H02J 2203/20; H02M 1/0016; H02M 1/0022
  USPC .......................................................... 307/11
  See application file for complete search history.

(56) References Cited

U.S. PATENT DOCUMENTS 7,821,157 B2 * 10/2010 Llorente Gonzelez ...................... H02J 3/1842
  307/45

FOREIGN PATENT DOCUMENTS

| CN | 104638653 A | 5/2015 |
| CN | 106529806 A | 3/2017 |
| CN | 111260188 A | 6/2020 |
| CN | 111600311 A | 8/2020 |
| CN | 112152224 A | 12/2020 |
| CN | 112583007 A | 3/2021 |

OTHER PUBLICATIONS

Lin et al. "Allocation Method of Voltage Sag Based on User's Quantitative Demand", IEEE 3rd International Conference on Electronics and Communication Engineering, pp. 250-254, 2020. (Year: 2020).*

* cited by examiner

*Primary Examiner* — Hal Kaplan

(57) ABSTRACT

The present invention discloses a method and device for formulating a coordinated action strategy of SSTS and DVR for voltage sag mitigation. The influence of voltage sag on a whole industrial process of a sensitive user is analyzed, and the sensitive loads of SSTS and DVR which satisfy a governance need are grouped; a practical governance scenario of installing a plurality of DVR is considered to install a minimum-capacity DVR to realize a target of a minimum interruption probability of the whole industrial process of the user; an optimal coordinated governance solution of SSTS and DVR based on sensitive load grouping is proposed; a classification result is obtained for duration time at a time when a voltage sag event occurs through a decision tree constructed based on historical data.

4 Claims, 3 Drawing Sheets

METHOD AND DEVICE FOR FORMULATING COORDINATED ACTION STRATEGY OF SSTS AND DVR FOR VOLTAGE SAG MITIGATION

CROSS REFERENCE TO RELATED APPLICATIONS

This application claims priority to Chinese Patent Application No. 202110703524.7, filed on Jun. 24, 2021, the entire contents of which are incorporated herein by reference.

TECHNICAL FIELD

The present invention relates to the technical field of voltage sag mitigation, and in particular to a method and device for formulating a coordinated action strategy of SSTS and DVR for voltage sag mitigation.

BACKGROUND

With the rapid development of high-tech enterprises, a large number of sensitive loads have been put into a production process, and an industrial process is frequently interrupted because industrial loads are sensitive to voltage sag, causing huge economic losses to users. At present, voltage sag mitigation work is usually carried out at different levels. A user grid level and a user equipment level are used as mainstream mitigation levels, and a coordinated mitigation solution for voltage sag by installation of 10 kV side SSTS and 380V side DVR is widely used. The coordinated action strategy of SSTS and DVR directly affects the mitigation effect of voltage sag of sensitive users. In addition, the investment of SSTS and DVR mitigation devices is large, and an optimal coordinated action strategy will effectively reduce the frequency of actions of the devices and increase the service life of the devices. Therefore, the research on the coordinated action strategy of SSTS and DVR for voltage sag mitigation is of great significance.

In the aspect of the coordinated action strategy of SSTS and DVR, the prior art studies the coordinated control method of SSTS and DVR based on voltage drop gradation and timing coordination, which mainly judges whether DVR acts or not at first, and then judges whether SSTS acts or not according to duration time. A specific implementation solution is: (1) the action strategy for DVR is that a voltage threshold is artificially set, and the DVR acts when the voltage drops below the threshold. (2) For the SSTS action, a first strategy is to start the SSTS according to the duration time greater than 2 ms on the basis of the DVR startup, and lock the DVR; and a second strategy is to start the DVR firstly according to the duration time greater than 2 ms on the basis that DVR is not started, and start the SSTS after DVR energy is exhausted.

The disadvantages of the current coordinated action strategy of SSTS and DVR are mainly as follows:

(1) Although the artificial setting of the threshold is based on the consideration of sensitive load tolerance characteristics, the whole industrial process of a user is not considered. Voltage sag does not necessarily cause the interruption of the industrial process of the user, and part of sensitive users automatically recovers after suffering from voltage sag. The prior art simply compares a voltage detection value with the threshold to judge whether there is an action, which leads to frequent actions of a device and increases the frequency of invalid actions of the DVR. The influence of voltage sag on the industrial processes of sensitive users is not fully considered.

(2) The prior art does not provide an action strategy for the DVR to respond to a condition that different types of sensitive loads suffer from different degrees of voltage sag events. A unified DVR action strategy with a fixed threshold is not suitable for all sensitive loads with DVR installed, but only suitable for a specific mitigation scenario of a single DVR.

(3) All sensitive loads of the users are generally powered by the same access bus, so various sensitive loads of various industrial sub-processes suffer the same disturbance under the same event. If SSTS acts, all the sensitive loads can be protected from voltage sag, without the need that DVR acts. Therefore, it is necessary to analyze mitigation requirements of sensitive loads, which can be met by the SSTS and the DVR, and judge whether the SSTS acts at the moment when a voltage sag event occurs. Because the prior art does not consider the above factors, unnecessary actions of SSTS and DVR are added.

(4) The ability of the DVR to support the sensitive loads is determined by the capacity of the installed DVR and compensation voltage. On the basis of economic optimum, configuration of DVR which meets the mitigation requirements of the sensitive loads is a key element that directly affects a final mitigation effect. Most of the prior arts do not determine the action strategy of a governance device based on an optimal governance solution of the DVR, and have the problem of poor economy, thereby reducing the investment and mitigation willingness of the user.

Explanation of terms:

SSTS: an abbreviation of "Solid State Transfer Switch", which is a switching voltage sag mitigation device. The main principle is to quickly transfer the load to another incoming line with normal power supply by controlling the linkage between an incoming line and a bus tie switch when voltage sag is detected on the incoming line. The device itself does not have standby power supply capability, and has certain switching time. The time for the load to suffer from the voltage sag depends on the switching speed.

DVR: an abbreviation of "Dynamic Voltage Restorer", which is a compensating voltage sag mitigation device. The main principle is that when a sensitive load loses power suddenly due to the occurrence of the voltage sag, electric energy required for normal operation is continuously provided for the sensitive load, and a sag effect on a load end is eliminated by the capability of the device.

Sensitive load VTC: a sensitive load voltage tolerance curve (VTC) is used to characterize the voltage sag tolerance capability of the sensitive load, as shown in FIG. 1. On a coordinate graph which takes duration time and amplitude as an abscissa and an ordinate, which is usually in the form of a rectangle, the position of the VTC is determined according to the position of a knee point. A voltage sag point is marked on the coordinate graph according to the amplitude and duration time of voltage sag. When the voltage sag point is located inside the curve, the sensitive load fails; and when the voltage sag point is located outside the curve, the sensitive load is operated normally.

SUMMARY

In view of the above problems, the purpose of the present invention is to provide a method and device for formulating a coordinated action strategy of SSTS and DVR for voltage sag mitigation. On the basis of considering the tolerance characteristics of sensitive loads, the present invention also analyzes the influence of voltage sag on the whole industrial process of a user, ensures the coordinated governance effect of SSTS and DVR to the greatest extent, and reduces the number of unnecessary actions of the governance device. The technical solution is as follows:

A method for formulating a coordinated action strategy of SSTS and DVR for voltage sag mitigation comprises the following steps:

step 1: grouping mitigation of sensitive loads: considering the whole industrial process of a sensitive user, and realizing the grouping of two groups of sensitive loads of SSTS mitigation and DVR mitigation; conducting grouping optimization again for the sensitive loads with the installation of DVR for compensation and mitigation; and finally outputting a grouping matrix and grouping compensation voltage;

step 2: classification of voltage sag duration time: based on the characteristics of historical voltage sag monitoring data, constructing a decision tree to predict whether the duration time of a newly generated voltage sag event is less than SSTS switching time to conduct classification;

step 3: according to a grouping mitigation solution of the sensitive loads obtained in step 1 and the classification of the voltage sag duration time obtained in step 2, when voltage sag is monitored, formulating an action strategy of SSTS and DVR as follows:

if the voltage sag duration time is less than the SSTS switching time, SSTS acts; otherwise, not acts;

if the amplitude of voltage sag is less than or equal to a minimum value of a voltage sag tolerance amplitude in a group of sensitive loads, the group of DVR acts.

Further, the grouping mitigation of the sensitive loads in step 1 specifically comprises:

step 1.1: grouping the sensitive loads according to connection modes and function types of the sensitive loads in the industrial process, comprising:

$S_1$-type sensitive loads: electrical series sensitive loads which cause a sub-process to be interrupted when tripping;

$S_2$-type sensitive loads: electrical parallel sensitive loads which may not cause the sub-process to be interrupted when tripping and may cause the sub-process to be interrupted when all the $S_2$-type sensitive loads trip;

$S_3$-type sensitive loads: control parallel sensitive loads which act on the industrial process through signal control, which are not directly connected to the industrial process, but may cause a control process to be interrupted when tripping;

step 1.2: based on the above grouping, further conducting secondary grouping for each sensitive load:

1) dividing the $S_2$-type sensitive loads into two categories according to whether the loads can recover automatically after suffering from voltage sag: sensitive loads capable of automatic recovery and sensitive loads incapable of automatic recovery;

2) dividing the $S_1$-type and $S_3$-type sensitive loads and the sensitive loads incapable of automatic recovery in the $S_2$-type sensitive loads into two categories $T_{tolerance} \leq T_1$ and $T_{tolerance} > T_1$ according to tolerant voltage sag duration time $T_{tolerance}$, wherein $T_1$ is the SSTS switching time; the former is compensated and governed by installing DVR, and the latter is governed by SSTS switching lines;

step 1.3: conducting grouping optimization of DVR mitigation on the sensitive loads with the tolerant voltage sag duration time $T_{tolerance} \leq T_1$: a grouping goal is to install minimum-capacity DVR, and a governance goal is to achieve a minimum interruption probability of a sensitive industrial process of the user; therefore, a grouping optimization model of the sensitive loads is constructed by taking the minimization of the capacity of the installed DVR and the minimization of the interruption probability of the sensitive industrial process as an objective function, and decision variables are the grouping matrix and the grouping compensation voltage.

Further, according to the grouping in the step 1.1, a calculation method of the probability that the industrial process of the sensitive loads is interrupted comprises:

assuming that an industrial user has n sensitive loads and M sensitive industrial processes; j is made to represent a sensitive load, and m represents a sensitive industrial process, i.e., j=1,2, . . . , n, m=1,2, . . . , M; then the tripping probabilities $P_{process-m_1}$, $P_{process-m_2}$ and $P_{process-m_3}$ of the sub-processes of $S_1$-type, $S_2$-type and $S_3$-type sensitive loads are respectively:

$$P_{process-m_1} = 1 - \prod_{j=1}^{A}(1 - P_{S_1-j}) \quad (1)$$

$$P_{process-m_2} = \prod_{j=1}^{B} P_{S_2-j} \quad (2)$$

$$P_{process-m_3} = 1 - \prod_{j=1}^{C}(P_{S_3-j} P_{S_3-control-j}) \quad (3)$$

wherein A, B and C are the number of three types of sensitive loads respectively; $P_{S_1-j}$, $P_{S_2-2}$ and $P_{S_3-j}$ are the tripping probabilities of the three types of sensitive loads respectively; and $P_{S_3 control-j}$ is the tripping probability of a device controlled by the $S_3$-type sensitive loads;

assuming that an m-th industrial process contains K, L and Q of the above three sub-processes respectively, the interruption probability of the industrial process is:

$$P_{process-m} = \prod_{m_1=1}^{K} P_{process-m_1} \prod_{m_2=1}^{L} P_{process-m_2} \prod_{m_3=1}^{Q} P_{process-m_3} \quad (4)$$

Further, the grouping mitigation optimization of the sensitive loads in step 1.3 specifically comprises:

1) setting an objective function:

setting the grouping matrix $[\alpha_0, \alpha_1, \ldots, \alpha_n]_i = [\alpha_j]_i$, wherein i represents an i-th group, $\alpha_j = 0$ or 1, $\alpha_j = 0$ indicates that the sensitive load is not in the i-th group, and $\alpha_j = 1$ indicates that the sensitive load is in the i-th group;

a first optimization objective is to minimize the sum of the capacities of installed DVR:

$$\min S_{DVR} = \sum_{i=1}^{N}\left(\frac{U_i}{U_n} \cdot S_{load-i}\right) \quad (5)$$

wherein $S_{DVR}$ is the sum of the capacities of i DVRs, N is the number of groups, $U_i$ is the compensation voltage of the i-th group, $U_n$ is the rated voltage of the sensitive user, and $S_{load-i}$ is the sum of the capacities of the i-th group of sensitive loads to be governed;

a second optimization objective is to minimize the interruption probability of the sensitive industrial process:

$$\min P_{process} = \sum_{m=1}^{M} P_{process-m} \qquad (6)$$

wherein $P_{process-m}$ is the interruption probability of an m-th sensitive industrial process;

2) setting constraints
① capacity constraints of the sensitive loads $$S_{load-i} = \sum_{j=1}^{n} (\alpha_j S_j) \qquad (7)$$

wherein $S_j$ is the rated capacity of a jth sensitive load;
② tripping probability constraints of the sensitive loads
the tripping probability $P_j$ of a single sensitive load is:

$$P_j = \iint_\Omega p(T_{sag}) p(U_{sag}) dU_{sag} dT_{sag} \qquad (8)$$

wherein $U_{sag}$ and $T_{sag}$ are amplitude and duration time of voltage sag respectively; $p(U_{sag})$ and $p(T_{sag})$ are probability density functions of the amplitude and the duration time of voltage sag respectively; $\Omega$ is a fault region determined by a load VTC; the specific data of each sensitive load is substituted into the above formula to obtain $P_{S_1-j}$, $P_{S_2-j}$, and $P_{S_3-j}$.

③ DVR compensation voltage constraints
$U_i$ is a compensation voltage amplitude that the DVR installed in the i-th group should output, i.e., a maximum value of compensation voltage required by the sensitive load wi-th $\alpha_j=1$ in the grouping matrix of the i-th group, and an expression is:

$$U_i = \max\{U_{\alpha_0}, U_{\alpha_1}, \ldots, U_{\alpha_n}|\alpha_j=1\} \qquad (9)$$

$$U_{\alpha_j} \leq U_{demand-\alpha} \qquad (10)$$

wherein $U_{\alpha_j}$ the compensation voltage of the jth sensitive load, and $U_{demand-\alpha_i}$ is the highest compensation voltage of the jth sensitive load to satisfy the requirement for voltage sag mitigation;

④ grouping constraints of the sensitive loads
there are only two cases for the grouping of any sensitive load:
a. the sensitive load does not belong to any group, i.e.:
$\alpha_j=0 \in [\alpha_0,\alpha_1,\ldots,\alpha_n]_i$, and $\alpha_j=0 \in [\alpha_0,\alpha_1,\ldots,\alpha_n]_{else-i}$;
b. if the sensitive load is divided into a certain group, the sensitive load is and can only be in the group; i.e.: when $\alpha_j=1 \in [\alpha,\alpha_1,\ldots,\alpha_n]_i$, $\alpha_j=0 \in [\alpha_0,\alpha_1,\ldots,\alpha_n]_{else-i}$;
wherein $[\alpha_0,\alpha_1,\ldots,\alpha_n]_{else-i}$ is a grouping matrix of other groups except the i-th group;

3) model solving
solving a Pareto optimal solution set of the model by an NSGA-II algorithm, and giving satisfaction to each objective function corresponding to each group of solutions in the Pareto optimal solution set by a slightly small fuzzy satisfaction function, as shown in formula (11):

$$\mu_{vo} = \begin{cases} 1, & f_{vo} \leq f_{o\,min} \\ \dfrac{f_{o\,max} - f_{vo}}{f_{o\,max} - f_{o\,min}}, & f_{o\,min} \leq f_{vo} \leq f_{o\,max} \\ 0, & f_{vo} \geq f_{o\,min} \end{cases} \qquad (11)$$

in the formula, $o \in \{1,2,\ldots,O\}$; $O$ is the number of objective functions; $\mu_{vo}$ is the satisfaction of an oth objective function corresponding to a vth group of Pareto solutions; $f_{vo}$ is a function value of the oth objective function corresponding to the vth group of solutions in the Pareto solution set; $f_{omin}$ is a minimum value of the function values of the oth objective function corresponding to all the solutions in the Pareto solution set; and $f_{omax}$ is a maximum value of the function values of the oth objective function corresponding to all the solutions in the Pareto solution set;
solving the satisfaction $\mu_v$ of each Pareto solution based on the satisfaction of each objective function corresponding to each Pareto solution;

$$\mu_v = \frac{1}{O} \sum_{v=1}^{O} \mu_{vo} \qquad (12)$$

using a Pareto solution with largest satisfaction $\mu_v$ as a final solution of a decision variable.

Further, the step 2 specifically comprises:
step 2.1: discretizing conditional attribute data
for the classification of the voltage sag duration time, selecting four characteristics of amplitude, phase jump, date and weather from multi-dimensional attributes as conditional attributes; for two types of continuous attribute data of the amplitude and the phase jump, merging adjacent sections according to chi-square test by a ChiMerge discrete method until criterion conditions are met; when discretizing date data, converting the date data into a digital quantity having a value changed continuously between 1 and 365 by taking days as a unit and years as a cycle; for the language description data of weather, dividing the weather according to weather categories;

step 2.2: building a decision tree root node
1) calculating an information entropy $E(T)$ of the voltage sag duration time $T_{sag} < T_1$:

$$E(T) = -(p_1 \log_2 p_1 + p_2 \log_2 p_2) \qquad (13)$$

wherein $T_1$ is the SSTS switching time; $p_1$ and $p_2$ are probabilities that a datum which is greater than or equal to $T_1$ and less than $T_1$ is randomly selected from a historical data set T of the voltage sag duration time;
2) calculating a conditional entropy $E(T,X)$ between the above four conditional attributes and $T_{sag} < T_1$:

$$E(T, X) = \sum_{c \in X} P(c) E(c) \qquad (14)$$

wherein X represents four conditional attributes; c represents a conditional attribute; $P(c)$ is a joint probability that a conditional attribute and $T_{sag} < T_1$ appear at the same time; and $E(c)$ is a conditional probability of $T_{sag} < T_1$ under a conditional attribute and with different values;

3) calculating mutual information $Gain(T,X)$ between the above four conditional attributes and $T_{sag} < T_1$:

$$Gain(T,X) = E(T) - E(T,X) \qquad (15)$$

the larger the value of mutual information is, the higher the correlation with $T_{sag} < T_1$ is; a conditional attribute with largest mutual information is selected as a decision tree root node;

step 2.3: building decision tree branch nodes and leaf nodes a specific operation process is the same as three points in step 2.2: calculating the information entropy, the conditional entropy and the mutual information; gradually discretizing results with the largest mutual information with $T_{sag}<T_1$ from results by using the conditional attributes, and attributes with largest mutual information with $T_{sag}<T_1$ from other conditional attributes as branch nodes; and iterating the process repeatedly until a complete decision tree with "Yes, No" of $T_{sag}<T_1$ as a leaf node is finally constructed based on historical data;

step 2.4: conducting classification by the decision tree when a monitoring device monitors a voltage sag event, inputting four conditional attribute data, and classifying the duration time of the new voltage sag event by a generated decision tree logic; and when the input data is consistent with the decision tree, entering a next branch for judgment, until a classification result of yes or no is obtained finally through the leaf node.

A device for formulating a coordinated action strategy of SSTS and DVR for voltage sag mitigation comprises a sensitive load grouping mitigation module, a voltage sag duration time classification module and an SSTS and DVR coordinated action strategy module;

the sensitive load grouping mitigation module comprises a first grouping module, a second grouping module and a sensitive load grouping mitigation optimization module;

the first grouping module divides the sensitive loads into electrical series sensitive loads, electrical parallel sensitive loads and control parallel sensitive loads according to the connection modes and function types of the sensitive loads in the industrial process;

the second grouping module divides the electrical parallel sensitive loads into the sensitive loads which can automatically recover and cannot recover automatically, and further classifies the sensitive loads which cannot recover automatically in the electrical series sensitive loads, the control parallel sensitive loads and the electrical parallel sensitive loads according to size relationships between the tolerant voltage sag duration time and the SSTS switching time;

the sensitive load grouping mitigation optimization module further groups and optimizes the sensitive loads having tolerant voltage sag duration time less than or equal to the SSTS switching time;

the voltage sag duration time classification module constructs a decision tree based on the characteristics of historical voltage sag monitoring data to predict whether the duration time of the newly generated voltage sag event is less than the SSTS switching time, to conduct classification;

the SSTS and DVR coordinated action strategy module formulates the action strategy of SSTS and DVR according to classification structures of the sensitive load grouping mitigation module and the voltage sag duration time classification module:

if the voltage sag duration time is less than the SSTS switching time, SSTS acts;

otherwise, not acts;

if the amplitude of voltage sag is less than or equal to a minimum value of a voltage sag tolerance amplitude in a group of sensitive loads, the group of DVR acts.

The present invention has the following beneficial effects:

1) On the basis of considering the tolerance characteristics of the sensitive loads, the present invention also analyzes the influence of voltage sag on the whole industrial process of the user, ensures the coordinated governance effect of SSTS and DVR to the greatest extent, and reduces the number of unnecessary actions of the governance device.

2) The sensitive load grouping mitigation solution mentioned in the present invention is suitable for the mitigation scenario of a plurality of DVRs; the sensitive load grouping solution and the configuration measures for DVR mitigation are provided; and the economy is good.

3) The coordinated action strategy of SSTS and DVR proposed by the present invention does not need to manually set an action threshold, but makes an action response according to the practical voltage sag situation of the user based on the optimal mitigation solution, thereby effectively reducing the frequency of invalid actions of the device.

DETAILED DESCRIPTION

The present invention will be further described in detail below in combination with the drawings and the embodiments.

Figure 1:
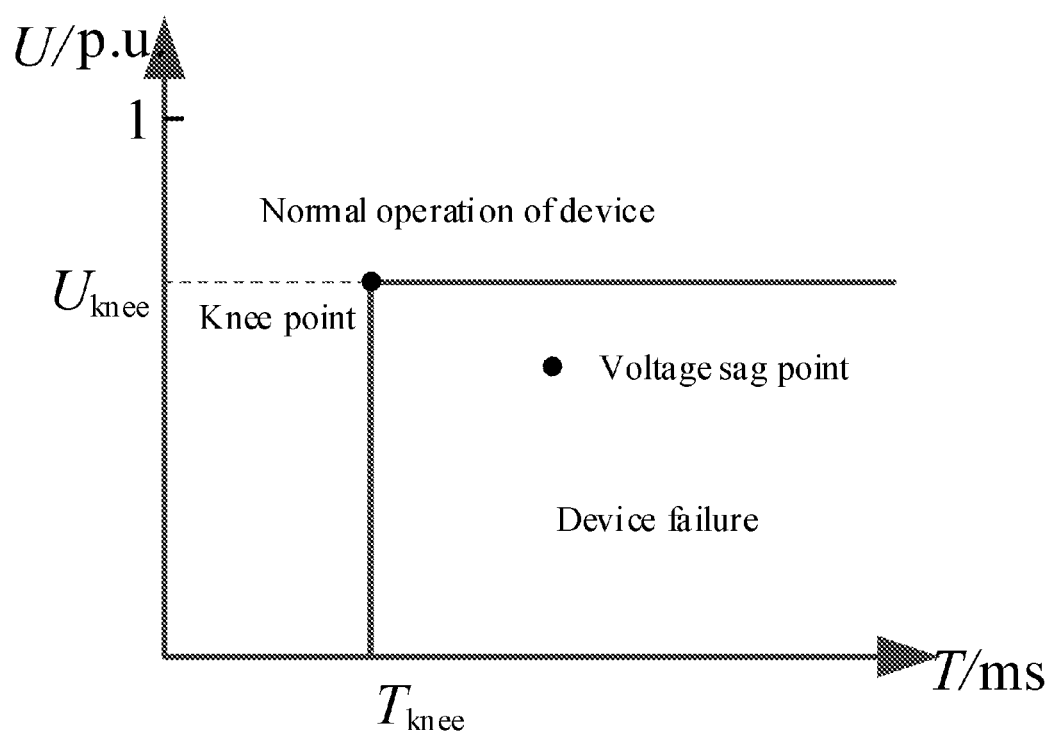
FIG. 1 is a sensitive load VTC.
Figure 2:
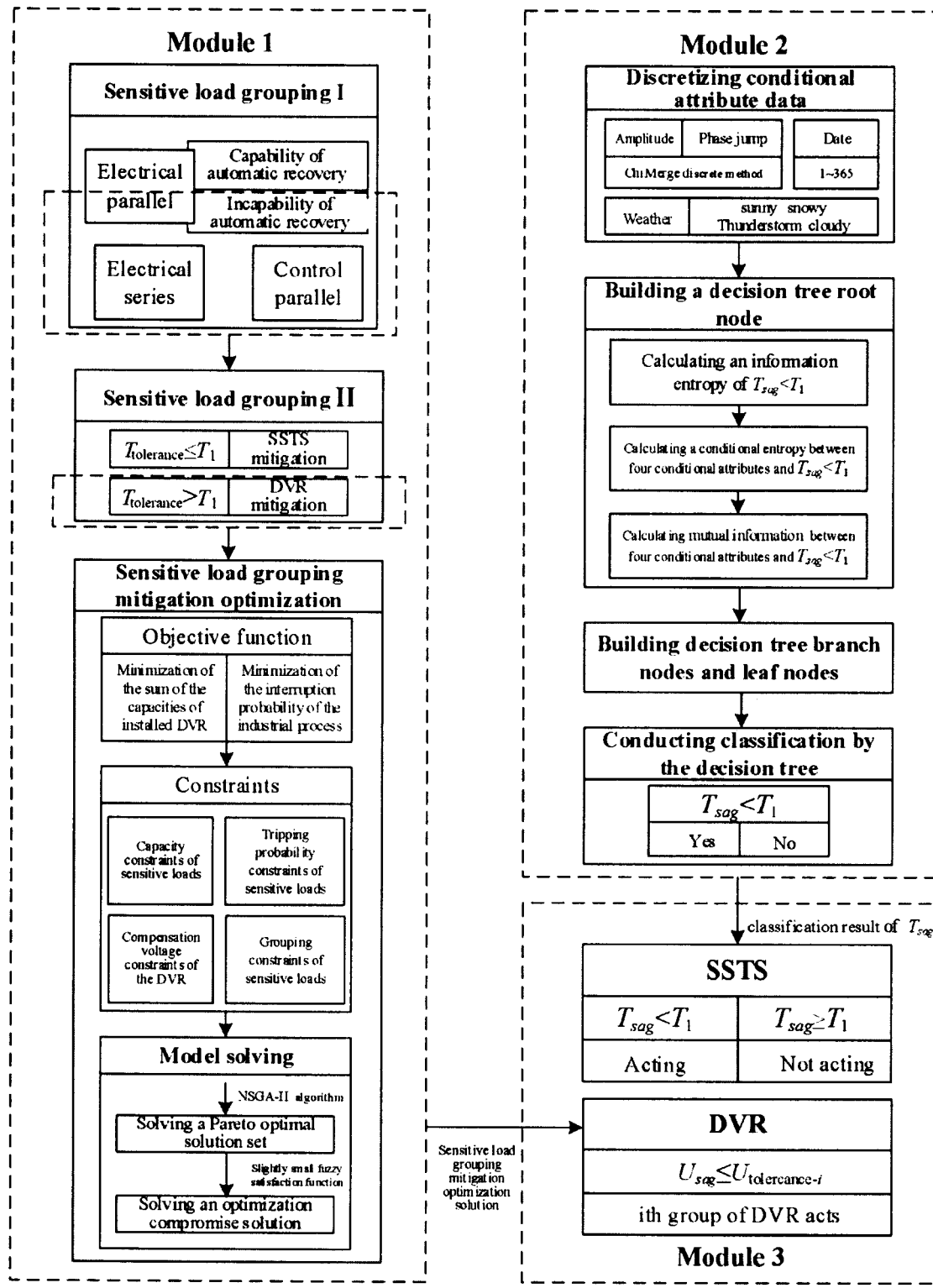
FIG. 2 is a structural diagram of a device for formulating a coordinated action strategy of SSTS and DVR for voltage sag mitigation in the present invention.

A device for formulating a coordinated action strategy of SSTS and DVR in the present invention comprises three modules: "module I: sensitive load grouping mitigation module", "module II: voltage sag duration time $T_{sag}$ classification module" and "module III: SSTS and DVR coordinated action strategy module" to realize a coordinated action strategy of SSTS and DVR for voltage sag mitigation. An overall flow chart is shown in FIG. 2. Module I: sensitive load grouping mitigation module The module is a sensitive load grouping mitigation module, which considers the whole industrial process of a sensitive user, and realizes the grouping of two groups of sensitive loads of SSTS mitigation and DVR mitigation; grouping optimization is conducted again for the sensitive loads with the installation of DVR for compensation and mitigation; and a grouping matrix and grouping compensation voltage are finally outputted. The module comprises the following steps:

Step 1: sensitive load grouping I grouping the sensitive loads according to connection modes and function types of the sensitive loads in the industrial process.

(1) electrical series ($S_1$): sensitive loads which cause a sub-process to be interrupted when tripping;

(2) electrical parallel ($S_2$): sensitive loads which may not cause the sub-process to be interrupted when tripping and assuming that the sub-process is interrupted when all the $S_2$-type sensitive loads trip;

(3) control parallel ($S_3$): sensitive loads which act on the industrial process through signal control, which are not directly connected to the industrial process, but may cause a control process to be interrupted when tripping.

It is assumed that an industrial user has n sensitive loads and M sensitive industrial processes; j is made to represent a sensitive load, and m represents a sensitive industrial process, i.e., j=1,2, . . . ,n, m=1,2, . . . , M. It is assumed that the SSTS switching time is $T_1$ and DVR switching time is $T_2$. In practice, $T_1 > T_2$.

The tripping probabilities $P_{process-m_1}$, $P_{process-m_2}$ and $P_{process-m_3}$ of the sub-processes of the three types of sensitive loads are respectively:

$$P_{process-m_1} = 1 - \prod_{j=1}^{A}(1 - P_{S_1-j}) \quad (1)$$

$$P_{process-m_2} = \prod_{j=1}^{B} P_{S_2-j} \quad (2)$$

$$P_{process-m_3} = 1 - \prod_{j=1}^{C}(P_{S_3-j} P_{S_3-control-j}) \quad (3)$$

wherein A, B and C are the number of three types of sensitive loads respectively; $P_{S_1-j}$, $P_{S_2-j}$ and $P_{S_3-j}$ are the tripping probabilities of the three types of sensitive loads respectively; and $P_{S_3-control-j}$ is the tripping probability of a device controlled by the $S_3$-type sensitive loads.

It is assumed that an m-th industrial process contains K, L and Q of the above three sub-processes respectively, the interruption probability of the industrial process is:

$$P_{process-m} = \prod_{m_1=1}^{K} P_{process-m_1} \prod_{m_2=1}^{L} P_{process-m_2} \prod_{m_3=1}^{Q} P_{process-m_3} \quad (4)$$

Step 2: sensitive load grouping II (1) dividing the $S_2$-type sensitive loads into two categories according to whether the loads can recover automatically after suffering from voltage sag: sensitive loads capable of automatic recovery and sensitive loads incapable of automatic recovery;

(2) dividing the $S_1$-type and S3-type sensitive loads and the sensitive loads incapable of automatic recovery in the $S_2$-type sensitive loads into two categories $T_{tolerance} \leq T_1$ and $T_{tolerance} > T_1$ according to tolerant voltage sag duration time $T_{tolerance}$, wherein the former is compensated and governed by installing DVR, and the latter is governed by SSTS switching lines;

(3) conducting grouping optimization of DVR mitigation on the sensitive loads with the tolerant voltage sag duration time $\leq T_1$.

Step 3: sensitive load grouping mitigation optimization conducting grouping optimization on the sensitive loads with installed DVR for compensation and mitigation, with a grouping goal to install minimum-capacity DVR, and a governance goal to achieve a minimum interruption probability of a sensitive industrial process of the user; and therefore, constructing a grouping optimization model of the sensitive loads by taking the minimization of the capacity of the installed DVR and the minimization of the interruption probability of the sensitive industrial process as an objective function, wherein decision variables are the grouping matrix and the grouping compensation voltage.

(1) Objective function setting the grouping matrix $[\alpha_0, \alpha_1, \ldots, \alpha_n]_i = 1$, wherein i represents an i-th group, $\alpha_j = 0$ or 1, $\alpha_j = 0$ indicates that the sensitive load is not in the i-th group, and $\alpha_j = 1$ indicates that the sensitive load is in the i-th group; a first optimization objective is to minimize the sum of the capacities of installed DVR:

$$\min S_{DVR} = \sum_{i=1}^{N}\left(\frac{U_i}{U_n} \cdot S_{load-i}\right) \quad (5)$$

wherein SDVR is the sum of the capacities of i DVRs, N is the number of groups, $U_1$ is the grouping compensation voltage, $U_n$ is the rated voltage of the sensitive user, and $S_{load-i}$ is the sum of the capacities of the i-th group of sensitive loads to be governed.

In addition, because each group has one DVR, i groups have i DVRs.

A second optimization objective is to minimize the interruption probability of the sensitive industrial process:

$$\min P_{process} = \sum_{m=1}^{M} P_{process-m} \quad (6)$$

wherein $P_{process-m}$ is the interruption probability of an m-th sensitive industrial process.

(2) Constraints

① Capacity constraints of the sensitive loads $$S_{load-i} = \sum_{j=1}^{n}(\alpha_j S_j) \quad (7)$$

wherein $S_j$ is the rated capacity of a jth sensitive load.

② Tripping probability constraints of the sensitive loads the tripping probability $P_j$ of a single sensitive load is $$P_j = \iint_\Omega p(T_{sag}) p(U_{sag}) dU_{sag} dT_{sag} \quad (8)$$

wherein $U_{sag}$ and $T_{sag}$ are amplitude and duration time of voltage sag respectively; $p(U_{sag})$ and $p(T_{sag})$ are probability density functions of the amplitude and the duration time of voltage sag respectively, which are obtained by fitting according to the historical monitoring data; $\Omega$ is a fault region determined by a load VTC. with the change of $U_i$, a knee point of the VTC changes, and $\Omega$ changes accordingly. The specific data of each sensitive load is substituted into the above formula to obtain $P_{S_1-j}$, $P_{S_2-j}$ and $P_{S_3-j}$.

③ DVR compensation voltage constraints $U_i$ is a compensation voltage amplitude that the DVR installed in the i-th group should output, i.e., a maximum value of compensation voltage required by the sensitive load with $\alpha_j = 1$ in the grouping matrix of the i-th group, and an expression is:

$$U_i = \max\{U_{\alpha_0}, U_{\alpha_1}, \ldots, U_{\alpha_n} | \alpha_j = 1\} \quad (9)$$

$$U_{\alpha_j} \leq U_{demand-\alpha_j} \quad (10)$$

wherein $U_{\alpha_1}$ is the compensation voltage of the jth sensitive load, and $U_{demand-\alpha_j}$ is the highest compensation voltage of the jth sensitive load to satisfy the requirement for voltage sag mitigation.

④ Grouping constraints of the sensitive loads

There are only two cases for the grouping of any sensitive load:

a. the sensitive load does not belong to any group, i.e.: $\alpha_j = 0 \in [\alpha_0, \alpha_1, \ldots, \alpha_n]_i$, and $\alpha_j = 0 \in [\alpha_0, \alpha_1, \ldots, \alpha_n]_{else-i}$;

b. if the sensitive load is divided into a certain group, the sensitive load is and can only be in the group. i.e.: when $\alpha_j = 1 \in [\alpha, \alpha_1, \ldots, \alpha_n]_i$, $\alpha_j = 0 \in [\alpha_0, \alpha_1, \ldots, \alpha_n]_{else-i}$.

Wherein $[\alpha_0, \alpha_1, \ldots, \alpha_n]_{else-i}$ is a grouping matrix of other groups except the i-th group.

(3) Model solving

Figure 3:
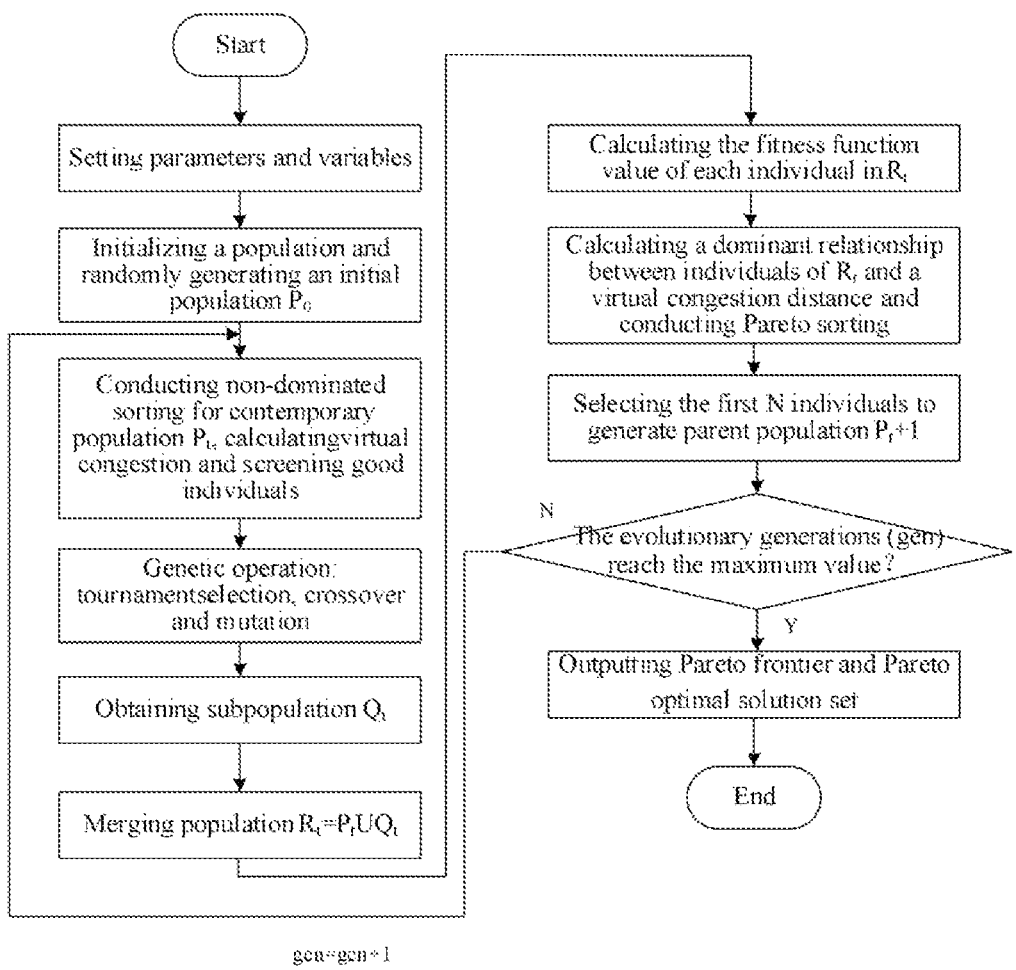
FIG. 3 is a flow chart of solving by NSGA-algorithm.

The minimum DVR capacity in the optimization model and the minimum interruption probability in the industrial process are two contradictory goals. When the decision variable is changed in a given feasible region, the optimization of the DVR capacity will cause the degradation of the interruption probability of the industrial process, so that a set of solutions which make the objective functions reach the minimum values at the same time does not exist, and the Pareto solution set can only be solved. NSGA-II algorithm is an effective method for searching Pareto frontier based on a genetic algorithm, and is suitable for solving the multi-objective optimization model here. The specific solving process is shown in FIG. 3.

After solving the Pareto optimal solution set by the NSGA-II algorithm, a set of optimal compromise solutions needs to be selected as a final solution for sensitive load grouping and compensation voltage for each group.

Two objective functions of the optimization model here pursue the minimum values. Satisfaction is given to each objective function corresponding to each group of solutions in the Pareto optimal solution set by a slightly small fuzzy satisfaction function, as shown in formula (11):

$$\mu_{vo} = \begin{cases} 1, & f_{vo} \leq f_{o\,min} \\ \dfrac{f_{o\,max} - f_{vo}}{f_{o\,max} - f_{o\,min}}, & f_{o\,min} \leq f_{vo} \leq f_{o\,max} \\ 0, & f_{vo} \geq f_{o\,min} \end{cases} \quad (11)$$

in the formula, $o \in \{1, 2, \ldots, O\}$; O is the number of objective functions; $\mu_{vo}$ is the satisfaction of an oth objective function corresponding to a vth group of Pareto solutions; $f_{vo}$ is a function value of the oth objective function corresponding to the vth group of solutions in the Pareto solution set; $f_{omin}$ is a minimum value of the function values of the oth objective function corresponding to all the solutions in the Pareto solution set; and Lax is a maximum value of the function values of the oth objective function corresponding to all the solutions in the Pareto solution set;

The satisfaction $\mu_v$ of each Pareto solution is solved based on the satisfaction of each objective function corresponding to each Pareto solution;

$$\mu_v = \frac{1}{O} \sum_{v=1}^{O} \mu_{vo} \quad (12)$$

A Pareto solution with largest satisfaction $\mu_v$ is used as a final solution of a decision variable.

Module II: voltage sag duration time $T_{sag}$ classification module

The module is a voltage sag duration time $T_{sag}$ classification module which constructs a decision tree based on the characteristics of historical voltage sag monitoring data to predict the classification of the duration time $T_{sag}<T_1$ of the newly generated voltage sag event: yes or no. "Yes" indicates $T_{sag}<T_1$ and "No" indicates $T_{sag}>T_1$. The module comprises the following steps:

Step 1: discretizing conditional attribute data

For the classification of the voltage sag duration time, selecting four characteristics of amplitude, phase jump, date and weather from multi-dimensional attributes as conditional attributes. For two types of continuous attribute data of the "amplitude" and the "phase jump", merging adjacent sections according to chi-square test by a ChiMerge discrete method until criterion conditions are met; when discretizing "date" data, converting the date data into a digital quantity having a value changed continuously between "1 and 365" by taking days as a unit and years as a cycle; for the language description data of "weather", dividing the weather into four categories: "sunny, snowy, thunderstorm and cloudy".

Step 2: building a decision tree root node (1) Calculating an information entropy E(T) of the voltage sag duration time $T_{sag}<T_1$:

$$E(T) = -(p_1 \log_2 p_1 + p_2 \log_2 p_2) \quad (13)$$

wherein $p_1$ and $p_2$ are probabilities that a datum$\geq T_1$ and $<T_1$ is randomly selected from a historical data set T of the voltage sag duration time.

(2) Calculating a conditional entropy E(T,X) between the four conditional attributes and $T_{sag}<T_1$:

$$E(T, X) = \sum_{c \in X} P(c) E(c) \quad (14)$$

wherein X represents four conditional attributes; c represents a conditional attribute; P(c) is a joint probability that a conditional attribute and $T_{sag}<T_1$ appear at the same time; and E(c) is a conditional probability of $T_{sag}<T_1$ under a conditional attribute and with different values.

(3) Calculating mutual information Gain(T,X) between the four conditional attributes and $T_{sag}<T_1$:

$$\text{Gain}(T,X) = E(T) - E(T,X) \quad (15)$$

The larger the value of mutual information is, the higher the correlation with $T_{sag}<T_1$ is. A conditional attribute with largest mutual information is selected as a decision tree root node.

Step 3: building decision tree branch nodes and leaf nodes

A specific operation process is the same as three points in step 2: calculating the information entropy, the conditional entropy and the mutual information; gradually discretizing results with the largest mutual information with $T_{sag}<T_1$ from results by using the conditional attributes, and attributes with largest mutual information with $T_{sag}<T_1$ from other conditional attributes as branch nodes; and iterating the process repeatedly until a complete decision tree with "Yes, No" of $T_{sag}<T_1$ as a leaf node is finally constructed based on historical data.

Step 4: conducting classification by the decision tree

When a monitoring device monitors a voltage sag event, inputting four conditional attribute data, and classifying the duration time of the new voltage sag event by a generated decision tree logic; and when the input data is consistent with the decision tree, entering a next branch for judgment, until a classification result of yes or no is obtained finally through the leaf node.

Module III: SSTS and DVR coordinated action strategy module

The module is an SSTS and DVR coordinated action strategy module. The output result of module I is used to determine the grouping mitigation solution for the sensitive loads. When the voltage sag event is monitored, the module II is used to output $T_{sag}$ classification. Based on the output results of module I and module II, when voltage sag is monitored, the action strategy of SSTS and DVR is formulated as follows:

(1) If $T_{sag}<T_1$, SSTS acts; and if $T_{sag}\geq T_1$, SSTS does not act.

(2) $U_{sag}\leq U_{tolercance-i}$, and the i-th group of DVR acts. $U_{tolercance-i}$ is the minimum value of the voltage sag tolerance amplitude in the i-th group of sensitive loads.

To sum up, the solution of the present invention is summarized as follows:

1) For the problems that whether the sensitive load should be governed and mitigation is conducted by SSTS or DVR, the present invention proposes a grouping method for sensitive loads with consideration of the whole industrial process of the user. From the perspective of the probability that a single sensitive load trips and causes interruption of the whole industrial process of the user, the method divides the loads into two categories based on the operating characteristics of SSTS and DVR;
2) For the sensitive loads governed by DVR, the present invention proposes a grouping mitigation optimization model for the sensitive loads. The model takes the minimum sum of capacities of installed DVR and the minimum interruption probability of the industrial process of the user as the goals, and considers four constraints. The NSGA-II algorithm and the slightly small fuzzy satisfaction function are used to finally determine the grouping solution and the compensation voltage of each group;
3) For the problem that whether the SSTS acts depends on the key factor of the voltage sag duration time, the present invention proposes a method for classifying $T_{sag}$ through the decision tree, and finally outputs the classification of yes or no for $T_{sag}<T_1$;
4) Based on the above three points, the present invention finally proposes a coordinated action strategy of SSTS and DVR for voltage sag mitigation. The action basis of SSTS is determined through points 1) and 3), and the action basis of each group of DVRs is determined through points 1) and 2).

What is claimed is:

1. A method for formulating a coordinated action strategy of SSTS and DVR for voltage sag mitigation, comprising the following steps:
    step 1: grouping mitigation of sensitive loads: considering a whole industrial process of a sensitive user, and realizing the grouping of two groups of sensitive loads of SSTS mitigation and DVR mitigation; conducting grouping optimization again for the sensitive loads with the installation of DVR for compensation and mitigation; and finally outputting a grouping matrix and grouping compensation voltage;
    step 2: classification of voltage sag duration time: based on the characteristics of historical voltage sag monitoring data, constructing a decision tree to predict whether the duration time of a newly generated voltage sag event is less than SSTS switching time to conduct classification;
    step 3: according to a grouping mitigation solution of the sensitive loads obtained in step 1 and the classification of the voltage sag duration time obtained in step 2, when voltage sag is monitored, formulating an action strategy of SSTS and DVR as follows:
    if the voltage sag duration time is less than the SSTS switching time, SSTS switches load to a normal incoming line for power supply; otherwise, SSTS does not switch; and
    if the amplitude of voltage sag is less than or equal to a minimum value of a voltage sag tolerance amplitude in a group of sensitive loads, DVR in the group of sensitive loads provides compensation voltage;
    and controlling actions of SSTS and DVR according to the action strategy of SSTS and DVR in step 3, so as to realize voltage sag compensation; and wherein
    the grouping mitigation of the sensitive loads in step 1 specifically comprises:
    step 1.1: grouping the sensitive loads according to connection modes and function types of the sensitive loads in the industrial process, comprising:
    $S_1$-type sensitive loads: electrical series sensitive loads in which the sensitive loads are connected in series and would cause a sub-process to be interrupted when tripping;
    $S_2$-type sensitive loads: electrical parallel sensitive loads in which the sensitive loads are connected in parallel and would not cause the sub-process to be interrupted when tripping and would cause the sub-process to be interrupted when all the $S_2$-type sensitive loads trip;
    $S_3$-type sensitive loads: control parallel sensitive loads in which the sensitive loads are connected in parallel and act on the industrial process through signal control, which are not directly set in the industrial process, but would cause a control process to be interrupted when tripping;
    step 1.2: based on the above grouping, further conducting secondary grouping for each sensitive load:
    1) dividing the $S_2$-type sensitive loads into two categories according to whether the loads can recover automatically after suffering from voltage sag: sensitive loads capable of recovering automatically from voltage sag and sensitive loads incapable of recovering automatically from voltage sag;
    2) dividing the $S_1$-type and $S_3$-type sensitive loads and the sensitive loads incapable of automatic recovery in the $S_2$-type sensitive loads into two categories $T_{tolerance}\leq T_1$ and $T_{tolerance}>T_1$ according to tolerant voltage sag duration time $T_{tolerance}$, wherein $T_1$ is the SSTS switching time; the former is compensated and governed by installing DVR, and the latter is governed by SSTS switching lines;
    step 1.3: conducting grouping optimization of DVR mitigation on the sensitive loads with the tolerant voltage sag duration time $T_{tolerance}\leq T_1$: a grouping goal is to install minimum-capacity DVR, and a governance goal is to achieve a minimum interruption probability of a sensitive industrial process of the user; therefore, a grouping optimization model of the sensitive loads is constructed by taking the minimization of the capacity of the installed DVR and the minimization of the interruption probability of the sensitive industrial process as an objective function, and decision variables are the grouping matrix and the grouping compensation voltage.

2. The method for formulating the coordinated action strategy of SSTS and DVR for voltage sag mitigation according to claim 1, wherein according to the grouping in the step 1.1, a calculation method of the probability that industrial process of the sensitive loads is interrupted comprises:
    assuming that an industrial user has n sensitive loads and M sensitive industrial processes; j is made to represent a sensitive load, and m represents a sensitive industrial process, i.e., P J=1,2, . . . ,n, m=1,2, . . . , M; then tripping probabilities $P_{process-m_1}$, $P_{process-m_2}$ and $P_{process-m_3}$ of sub-processes of $S_1$-type, $S_2$-type and $S_3$-type sensitive loads are respectively:

$$P_{process-m_1} = 1 - \prod_{j=1}^{A}(1 - P_{S_1-j}) \quad (1)$$

$$P_{process-m_2} = \prod_{j=1}^{B} P_{S_2-j} \quad (2)$$

$$P_{process-m_3} = 1 - \prod_{j=1}^{C}(P_{S_3-j} P_{S_3-control-j}) \quad (3)$$

wherein A, B and C are the number of three types of sensitive loads respectively; $P_{S_1-j}, P_{S_2-j}$ and $P_{S_3-j}$ are tripping probabilities of the three types of sensitive loads respectively; and $P_{S_3control-j}$ is the tripping probability of a device controlled by the $S_3$-type sensitive loads;
assuming that an m-th industrial process contains K, L and Q of the above three sub-processes respectively, the interruption probability of the industrial process is:

$$P_{process-m} = \prod_{m_1=1}^{K} P_{process-m_1} \prod_{m_2=1}^{L} P_{process-m_2} \prod_{m_3=1}^{Q} P_{process-m_3} \quad (4)$$

3. The method for formulating the coordinated action strategy of SSTS and DVR for voltage sag mitigation according to claim 1, wherein a grouping mitigation optimization of the sensitive loads in step 1.3 specifically comprises:
1) setting an objective function:
setting the grouping matrix $[\alpha_0, \alpha_1, \ldots, \alpha_n]_i = [\alpha_j]_i$, wherein i represents an i-th group, $\alpha_j=0$ or 1, $\alpha_j=0$ indicates that the sensitive load is not in the i-th group, and $\alpha_j=1$ indicates that the sensitive load is in the i-th group;
a first optimization objective is to minimize the sum of the capacities of installed DVRs:

$$\min S_{DVR} = \sum_{i=1}^{N}\left(\frac{U_i}{U_n} \cdot S_{load-i}\right) \quad (5)$$

wherein $S_{DVR}$ is the sum of the capacities of i DVRs, N is the number of groups of DVRs, $U_i$ is the compensation voltage of the i-th group, $U_n$ is the rated voltage of the sensitive user, and $S_{load-i}$ is the sum of the capacities of the i-th group of sensitive loads to be governed;
a second optimization objective is to minimize the interruption probability of a sensitive industrial process:

$$\min P_{process} = \sum_{m=1}^{M} P_{process-m} \quad (6)$$

wherein $P_{process-m}$ is the interruption probability of an m-th sensitive industrial process;
2) Setting constraints
① capacity constraints of the sensitive loads $$S_{load-i} = \sum_{j=1}^{n}(\alpha_j S_j) \quad (7)$$

wherein $S_j$ is the rated capacity of a jth sensitive load;
② tripping probability constraints of the sensitive loads
the tripping probability $P_j$ of a single sensitive load is:

$$P_j = \iint_\Omega p(T_{sag}) p(U_{sag}) dU_{sag} dT_{sag} \quad (8)$$

wherein $U_{sag}$ and $T_{sag}$ are amplitude and duration time of voltage sag respectively; $p(U_{sag})$ and $p(T_{sag})$ are probability density functions of the amplitude and the duration time of voltage sag respectively; $\Omega$ is a fault region determined by a load VTC; the specific data of each sensitive load is substituted into the above formula to obtain $P_{S_1-j}$, $P_{S_2-j}$, and $P_{S_3-j}$;
③ DVR compensation voltage constraints
$U_i$ is a compensation voltage amplitude that the DVR installed in the i-th group should output, i.e., a maximum value of compensation voltage required by the sensitive load with $\alpha_j=1$ in the grouping matrix of the i-th group, and an expression is:

$$U_i = \max\{U_{\alpha_0}, U_{\alpha_1}, \ldots, U_{\alpha_n} | \alpha_j=1\} \quad (9)$$

$$U_{\alpha_j} \leq U_{demand-\alpha_j} \quad (10)$$

wherein $U_{\alpha_j}$ is the compensation voltage of the jth sensitive load, and $U_{demand-\alpha_j}$ is the highest compensation voltage of the jth sensitive load to satisfy the requirement for voltage sag mitigation;
④ grouping constraints of the sensitive loads
there are only two cases for the grouping of any sensitive load:
a. the sensitive load does not belong to any group, i.e.:
$\alpha_j=0 \in [\alpha_0, \alpha_1, \ldots, \alpha_n]_i$, and $\alpha_j=0 \in [\alpha_0, \alpha_1, \ldots, \alpha_n]_{else-i}$;
b. if the sensitive load is divided into a certain group, the sensitive load is and can only be in the group; i.e.: when $\alpha_j=1 \in [\alpha, \alpha_1, \ldots, \alpha_n]_i$, $\alpha_j=0 \in [\alpha_0, \alpha_1, \ldots, \alpha_n]_{else-i}$;
wherein $[\alpha_0, \alpha_1, \ldots, \alpha_n]_{else-i}$ is a grouping matrix of other groups except the i-th group;
3) model solving
solving a Pareto optimal solution set of the model by an NSGA-II algorithm, and giving satisfaction to each objective function corresponding to each group of solutions in the Pareto optimal solution set by a slightly small fuzzy satisfaction function, as shown in formula (11):

$$\mu_{vo} = \begin{cases} 1, & f_{vo} \leq f_{o\,min} \\ \dfrac{f_{o\,max} - f_{vo}}{f_{o\,max} - f_{o\,min}}, & f_{o\,min} \leq f_{vo} \leq f_{o\,max} \\ 0, & f_{vo} \geq f_{o\,min} \end{cases} \quad (11)$$

in the formula, $o \in \{1, 2, \ldots, O\}$; O is the number of objective functions; $\mu_{vo}$ is the satisfaction of an oth objective function corresponding to a vth group of Pareto solutions; $f_{vo}$ is a function value of the oth objective function corresponding to the vth group of solutions in the Pareto solution set; $f_{o\,min}$ is a minimum value of the function values of the oth objective function corresponding to all the solutions in the Pareto solution set; and $f_{o\,max}$ is a maximum value of the function values of the oth objective function corresponding to all the solutions in the Pareto solution set;
solving the satisfaction $\mu_v$ of each Pareto solution based on the satisfaction of each objective function corresponding to each Pareto solution;

$$\mu_v = \frac{1}{O}\sum_{v=1}^{O}\mu_{vo} \qquad (12)$$

using a Pareto solution with largest satisfaction $\mu_v$ as a final solution of a decision variable.

4. The method for formulating the coordinated action strategy of SSTS and DVR for voltage sag mitigation according to claim 1, wherein the step 2 specifically comprises:

step 2.1: discretizing conditional attribute data for the classification of the voltage sag duration time, selecting four characteristics of amplitude, phase jump, date and weather from multi-dimensional attributes as conditional attributes; for two types of continuous attribute data of the amplitude and the phase jump, merging adjacent sections according to chi-square test by a ChiMerge discrete method until criterion conditions are met; when discretizing date data, converting the date data into a digital quantity having a value changed continuously between 1 and 365 by taking days as a unit and years as a cycle; for the weather which is a language description data, dividing the weather according to weather categories;

step 2.2: building a decision tree root node 1) calculating an information entropy E(T) of the voltage sag duration time $T_{sag} < T_1$:

$$E(T) = -(p_1 \log_2 p_1 + p_2 \log_2 p_2) \qquad (13)$$

wherein $T_1$ is the SSTS switching time; $p_1$ is probabilities that a datum which is greater than or equal to $T_1$ is randomly selected from a historical data set T of the voltage sag duration time, $p_2$ is probabilities that a datum which is less than $T_1$ is randomly selected from a historical data set T of the voltage sag duration time;

2) Calculating a conditional entropy E(T,X) between the above four conditional attributes and $T_{sag} < T_1$:

$$E(T, X) = \sum_{c \in X} P(c)E(c) \qquad (14)$$

wherein X represents four conditional attributes; c represents a conditional attribute; P(c) is a joint probability that a conditional attribute and $T_{sag} < T_1$ appear at the same time; and E(c) is a conditional probability of $T_{sag} < T_1$ under a conditional attribute and with different values;

3) calculating mutual information Gain(T,X) between the above four conditional attributes and $T_{sag} < T_1$:

$$\text{Gain}(T,X) = E(T) - E(T,X) \qquad (15)$$

the larger the value of mutual information is, the higher the correlation with $T_{sag} < T_1$ is; a conditional attribute with largest mutual information is selected as a decision tree root node;

step 2.3: building decision tree branch nodes and leaf nodes a specific operation process is the same as three points in step 2.2: calculating the information entropy, the conditional entropy and the mutual information; gradually discretizing results with the largest mutual information with $T_{sag} < T_1$ from results by using the conditional attributes, and attributes with largest mutual information with $T_{sag} < T_1$ from other conditional attributes as branch nodes; and iterating the process repeatedly until a complete decision tree with "Yes, No" of $T_{sag} < T_1$ as a leaf node is finally constructed based on historical data;

step 2.4: conducting classification by the decision tree when a monitoring device monitors a voltage sag event, inputting four conditional attribute data, and classifying the duration time of the new voltage sag event by a generated decision tree logic; and when the input data is consistent with the decision tree, entering a next branch for judgment, until a classification result of yes or no is obtained finally through the leaf node.

\* \* \* \* \*